(12) United States Patent
Nixon

(10) Patent No.: US 9,279,458 B2
(45) Date of Patent: Mar. 8, 2016

(54) ANGULAR POSITIONING ARRANGEMENT

(71) Applicant: Goodrich Control Systems, Solihul, West Midlands (GB)

(72) Inventor: John Edward Nixon, North Marston (GB)

(73) Assignee: Goodrich Control Systems (GB)

( * ) Notice: Subject to any disclaimer, the term of this patent is extended or adjusted under 35 U.S.C. 154(b) by 271 days.

(21) Appl. No.: 13/922,390

(22) Filed: Jun. 20, 2013

(65) Prior Publication Data
US 2013/0343816 A1 Dec. 26, 2013

(30) Foreign Application Priority Data

Jun. 20, 2012 (GB) .................... 1210894.0

(51) Int. Cl.
| | | |
|---|---|---|
| *B25G 3/28* | (2006.01) | |
| *F16D 1/08* | (2006.01) | |
| *F16D 1/072* | (2006.01) | |
| *H02K 1/30* | (2006.01) | |
| *F16D 1/06* | (2006.01) | |
| *F16D 1/10* | (2006.01) | |

(52) U.S. Cl.
CPC .................. *F16D 1/08* (2013.01); *F16D 1/072* (2013.01); *F16D 1/0858* (2013.01); *H02K 1/30* (2013.01); *F16D 2001/062* (2013.01); *F16D 2001/103* (2013.01); *Y10T 403/7035* (2015.01)

(58) Field of Classification Search
CPC ......... F16D 1/072; F16D 1/08; F16D 1/0858; F16D 2001/062; F16D 2001/103; Y10T 403/7035; Y10T 403/7033; Y10T 403/7062; Y10T 403/7064; Y10T 403/7067; Y10T 403/7069; Y10T 403/7084; H02K 1/30
USPC .................. 403/1, 280, 281, 282, 358, 359.1, 403/359.5, 359.6, 367–369, 373, 374.1, 403/374.3, 374.4, 379.3
See application file for complete search history.

(56) References Cited

U.S. PATENT DOCUMENTS

| | | | | |
|---|---|---|---|---|
| 3,351,364 | A * | 11/1967 | Warn et al. ........................ | 403/1 |
| 4,993,370 | A * | 2/1991 | Hashiyama et al. ....... | 123/90.17 |
| 5,201,679 | A * | 4/1993 | Velte et al. ..................... | 440/49 |
| 5,474,403 | A * | 12/1995 | Hetrich ........................ | 403/369 |
| 5,695,297 | A * | 12/1997 | Geib ............................. | 403/371 |
| 6,241,616 | B1 * | 6/2001 | Lightcap ...................... | 464/162 |
| 7,172,361 | B2 * | 2/2007 | Minamoto et al. ......... | 403/359.5 |
| 2003/0129023 | A1 | 7/2003 | Brunner et al. | |
| 2008/0279652 | A1 | 11/2008 | Mielke | |
| 2011/0241498 | A1 | 10/2011 | Vedy | |

FOREIGN PATENT DOCUMENTS

| | | |
|---|---|---|
| DE | 1105669 B | 4/1961 |
| DE | 19536057 C1 | 6/1997 |
| DE | 20217393 U1 | 3/2004 |

(Continued)

*Primary Examiner* — Gregory Binda
*Assistant Examiner* — Nahid Amiri
(74) *Attorney, Agent, or Firm* — Kinney & Lange, P.A.

(57) ABSTRACT

A positioning arrangement for positioning a rotor relative to a shaft includes a collar provided with a formation cooperable with a corresponding formation provided upon the shaft to resist relative angular movement between the collar and the shaft, the collar being provided with an external, generally axially extending rib cooperable with a part of the rotor to deform the said part of the rotor to resist relative rotation between the collar and the rotor.

13 Claims, 3 Drawing Sheets

(56) References Cited

FOREIGN PATENT DOCUMENTS

| JP | 11299140 | A | 10/1999 |
| JP | 2007132493 | A * | 5/2007 |
| WO | 02057645 | A1 | 7/2002 |

* cited by examiner

ANGULAR POSITIONING ARRANGEMENT

CROSS-REFERENCE TO RELATED APPLICATION(S)

This application claims priority from UK Patent Application No. 1210894.0 filed in the name of Goodrich Control Systems on Jun. 20, 2012.

BACKGROUND

This invention relates to an angular positioning arrangement, and in particular to an angular positioning arrangement suitable for use in securing a rotor of a resolver or position sensor associated with a rotary shaft of an actuator against angular movement relative to that shaft. However, it may be used in other applications.

Where a resolver or rotary position sensor is associated with a rotatable shaft, for example associated with an actuator, to provide position information, it is important that the rotor of the resolver or position sensor is firmly and reliably secured to the shaft in a known angular position relative to the shaft. Any movement of the rotor relative to the shaft, or incorrect angular installation of the rotor relative to the shaft, may result in incorrect position information being supplied to an associated controller which could result in inappropriate control over the actuator or other device of which the shaft forms part or with which it is associated. Furthermore, it is desirable for the axial position of the rotor to be accurately aligned with an associated stator.

One technique used in positioning and securing a rotor of a position sensor or resolver to a shaft is to, prior to installation, move the rotor of the sensor relative to a stator thereof until the output of the position sensor reaches a null-point value. Once this position has been reached, the rotor and stator are both marked to indicate the relative positions occupied by the rotor and stator when in the null-point position. The stator is then mounted in position upon the actuator or other device with which it is to be used such that the stator position is fixed. The rotor is then positioned upon the actuator shaft, with the actuator occupying a known position which will, in use, correspond to the null-point position of the sensor. Keeping the shaft stationary, the rotor position is adjusted to bring the markings into alignment with one another.

In order to secure the rotor in this position relative to the shaft, the rotor is formed with a pair of slots. Once correctly positioned upon the shaft, the shaft is deformed, for example by swaging, to force part of the shaft material into the slots of the rotor, and thereby prevent relative movement between the shaft and the rotor.

US2011/0241498 describes another technique for securing a resolver rotor to a shaft. It includes a bearing by which the resolver is mounted upon the shaft, and a lock arrangement for locking the resolver in a chosen angular orientation relative to the shaft.

US2008/0279652 describes a coupling in which one component is provided with a series of serrations received within recesses formed in another component.

There is a desire to provide an alternative positioning arrangement whereby a rotor can be secured to a shaft in a desired angular position. Furthermore, there is a desire to provide an arrangement which allows removal of the rotor from the shaft, for example to allow replacement of the rotor in the event that replacement thereof is required.

SUMMARY

According to the present invention there is provided a positioning arrangement for positioning a rotor relative to a shaft, the positioning arrangement comprising a collar provided with a formation cooperable with a corresponding formation provided upon the shaft to resist relative angular movement between the collar and the shaft, the collar being provided with an external, generally axially extending rib cooperable with a part of the rotor to deform the said part of the rotor to resist relative rotation between the collar and the rotor.

Preferably, the formation provided on the collar comprises a spline formation cooperable with a corresponding spline formation provided upon the shaft.

Conveniently, the said generally axially extending rib is one of a plurality of ribs or serrations provided upon the collar. The said part of the rotor is conveniently provided with one or more grooves to aid deformation by the rib. The grooves are conveniently substantially annular grooves. Alternatively, they could comprise parts of, for example, a screw threaded region of the rotor.

Preferably, the rib extends over only part of the axial length of the collar, allowing the collar formation to mate with the corresponding formation of the shaft prior to engagement occurring between the rib and the said part of the rotor. Consequently, after initial insertion of the collar, angular movement of the rotor to the desired position is permitted. Further axial movement of the collar results in deformation and engagement occurring between the collar and the rotor to position and retain the rotor against angular movement relative to the shaft.

Preferably, a clamp arrangement is provided to secure the collar to the shaft. The clamp arrangement conveniently comprises a clamp member keyed to the collar against angular movement relative thereto, and a lock nut threadingly engaged with the shaft and serving to clamp the clamp member to the collar to prevent or resist axial movement thereof. The lock nut is preferably provided with at least one slot into which part of the clamp member can be deformed, after tightening of the lock nut, to resist rotation of the clamp member relative to the lock nut. As a consequence, angular movement of the lock nut relative to the collar is resisted. Further, since rotation of the collar relative to the shaft is not permitted, it will be appreciated that this arrangement prevents rotation of the lock nut and so ensures that the lock nut cannot work loose, in use.

BRIEF DESCRIPTION OF THE DRAWINGS

The invention will further be described, by way of example, with reference to the accompanying drawings, in which.

DETAILED DESCRIPTION

Figure 1:
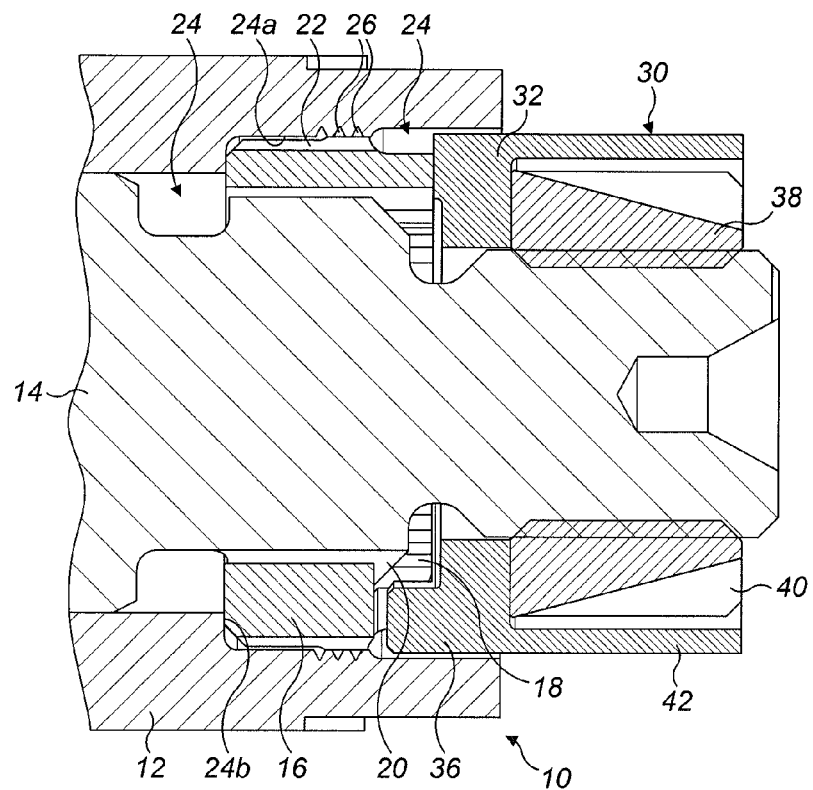
FIG. 1 is a diagrammatic sectional view illustrating a positioning arrangement in accordance with an embodiment of the invention in use, securing a rotor and shaft to one another against relative angular movement.

Referring to the accompanying drawings, a positioning arrangement 10 is shown for use in securing a rotor 12 of a resolver or position sensor (the remainder of which is not shown) to a shaft 14, for example associated with an actuator (not shown) or the like. The positioning arrangement 10 is operable to secure the rotor 12 and shaft 14 to one another such that both axial and rotary movement therebetween is resisted.

The positioning arrangement 10 comprises a collar 16 of annular form which is positioned over and encircles a part of the shaft 14. The collar 16 is provided, on its inner surface, with a series of spline formations 18 which, in use, cooperate with corresponding formations 20 provided upon the adjacent part of the shaft 14 so as to key the collar 16 to the shaft 14, resisting relative angular movement therebetween. Whilst resisting angular movement, the cooperation between the spline formations 18, 20 permits axial movement of the collar 16 to occur relative to the shaft 14.

Figure 2:
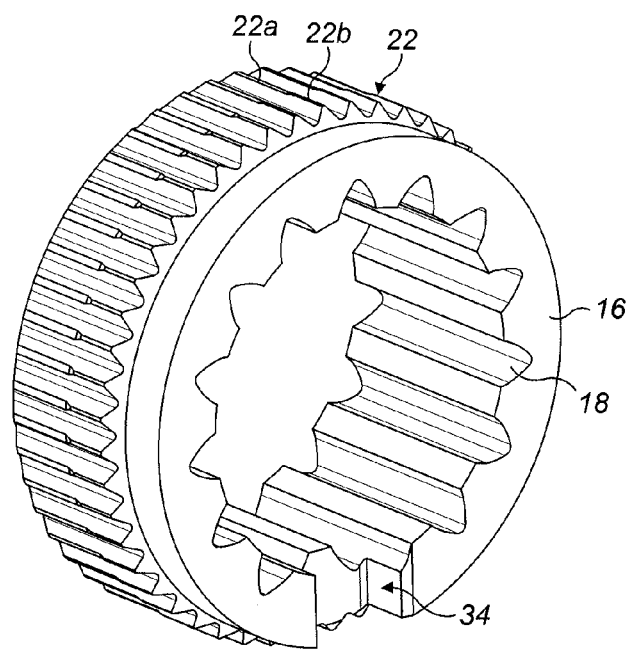
FIG. 2 is a perspective view illustrating part of the positioning arrangement.

On its external surface the collar 16 is provided with a series of ribs 22, each rib extending generally axially of the collar 16. As best shown in FIG. 2, each rib 22 includes a reduced height part 22a extending from one end of the collar 16 to an intermediate part thereof, and a full height part 22b extending from the intermediate part to the other end of the collar 16.

The collar 16 is received within a bore or opening 24 formed within the rotor 12. The bore or opening 24 is of stepped diameter, defining a part 24a of internal diameter approximately equal to or slightly larger than the diameter of the reduced height parts 22a of the ribs 22 and smaller than the diameter of the full height parts 22b of the ribs 22. The part 24a of the bore or opening 24 is formed with a series of annular grooves 26. The positioning of the grooves 26 is such that, when the collar 16 occupies the assembled position shown in FIG. 1, the grooves 26 lie adjacent the full height parts 22b of the ribs 22.

By way of example, it is envisaged that the diameter of the full height parts 22b of the ribs 22 will be in the region of 0.03 mm to 0.07 mm greater than the internal diameter of the part 24b of the bore or opening 24.

The positioning arrangement 10 further comprises a clamp arrangement 30 operable to secure the collar 16 against axial movement, in use. The clamp arrangement 30 comprises a clamp member 32 which encircles part of the shaft 14 and bears against an end of the collar 16. As shown in FIG. 2, the collar 16 is shaped to define a pocket 34 into which a projection 36 provided on the clamp member 32 extends such that the collar 16 and clamp member 32 are keyed to one another against relative angular movement.

The clamp arrangement 30 further comprises a lock nut 38 which is in screw threaded engagement with thread formations provided upon the shaft 14 and which serves to clamp the clamp member 32 against the collar 16 which, in turn, clamps the collar 16 against a step 24b of the bore or opening 24.

Figure 4:
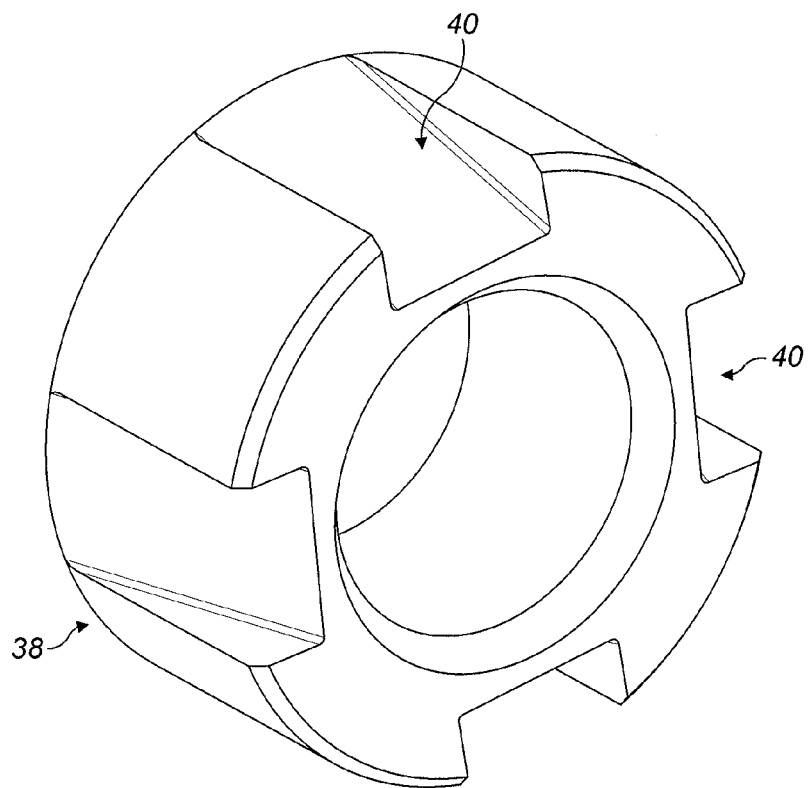
FIG. 4 is a perspective view of another part of the positioning arrangement.

As shown in FIG. 4, the lock nut 38 is shaped to define a series of recesses 40. The clamp member 32 is shaped to include a relatively thin walled part 42 which extends adjacent and encircles the lock nut 38. The recesses 40 may serve to allow engagement of the lock nut by an appropriate tool to allow tightening thereof onto the shaft 14. In addition, as described below, once assembled the thin walled part 42 may be deformed into the recesses 40 to lock the nut 38 against rotation.

Figure 5:
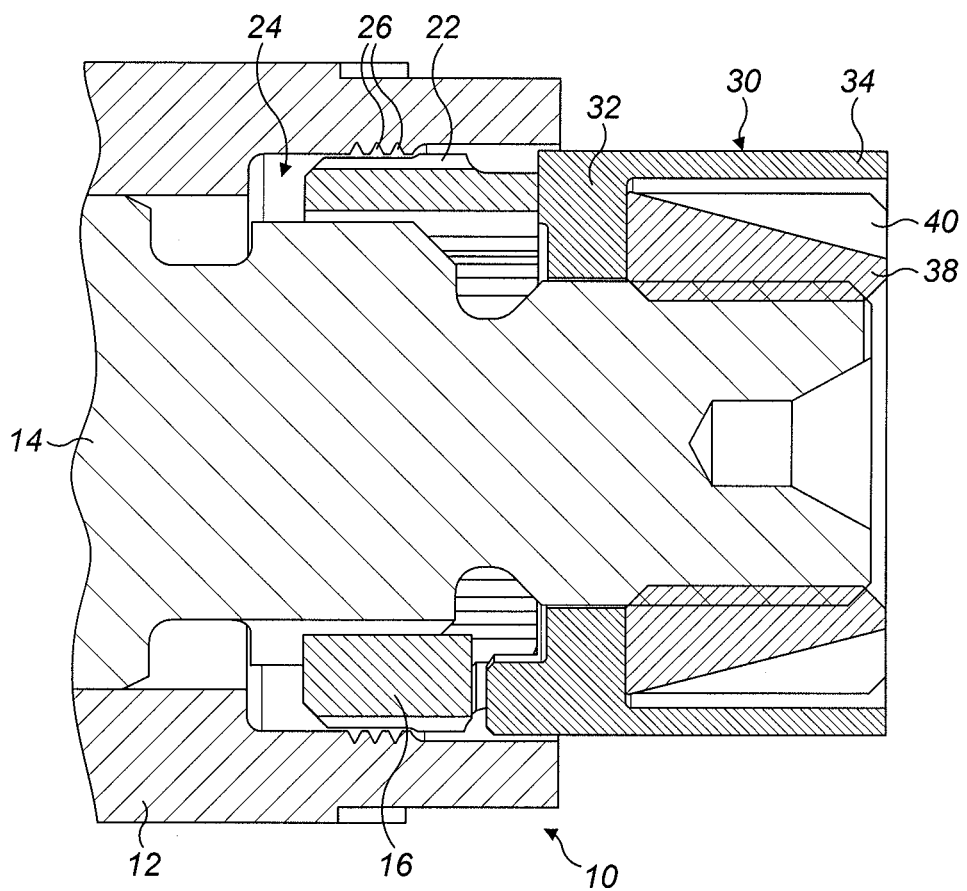
FIG. 5 is a view similar to FIG. 1, illustrating the positioning arrangement during the assembly process.

In use, during assembly, the rotor 12 and associated stator are marked so as to provide an indication of their relative orientations when occupying a null-point position as described hereinbefore. The stator is then mounted in the desired position, and the rotor 12 is introduced onto the shaft 14. Once the rotor 12 has been located upon the shaft 14, the collar 16 is located upon the shaft 14 with the spline formations 18 of the collar 16 engaging with the corresponding formations 20 provided upon the adjacent part of the shaft 14 such that angular movement of the collar 16 relative to the shaft 14 is not permitted. At this stage in the assembly process, however, the collar 16 is only partially introduced into the part 24a of the bore or opening 24 of the rotor 12, as shown in FIG. 5. In this position, the cooperation between the collar 16 and the rotor 12 is such that relative angular movement therebetween is permitted, as the full height parts 22b of the ribs 22 have not yet been introduced into the part 24a of the bore or opening 24 of the rotor 12. Whilst in this position, the rotor 12 is rotated to the correct angular position relative to the stator, whilst the shaft 14 is held in the desired angular orientation.

Once the desired orientation of the rotor 12 has been attained, the rotor 12 is locked to the shaft 14 by fully inserting the collar 16. This may be achieved by positioning the clamp member 32 against the collar 16 with the projection 36 thereof located within the recess 34, and by tightening of the locking nut 38. Alternatively, it may be achieved by application of a suitable load to the collar 16 to fully introduce it, subsequently using the clamp member 32 and locking nut 38 to secure the collar 16 in position.

Figure 3:
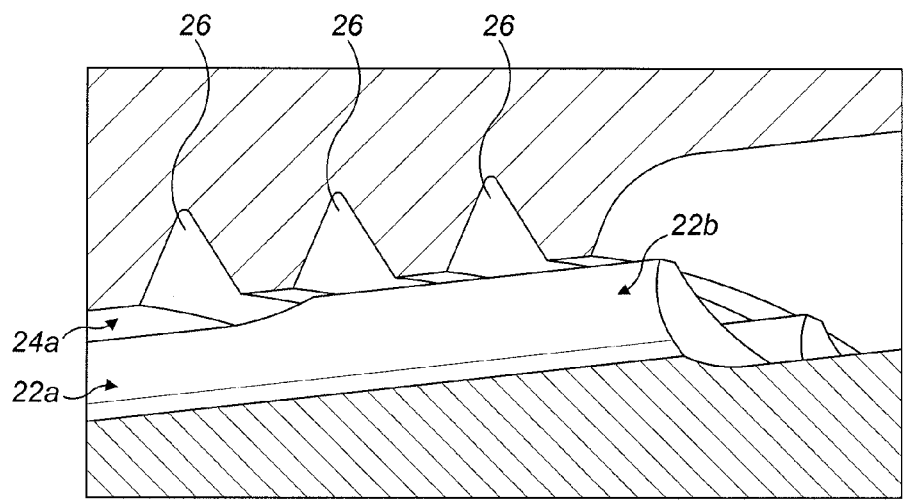
FIG. 3 is a diagram illustrating the interaction between part of the positioning arrangement and the rotor.

Regardless of the technique used to fully insert the collar 16, the action of fully inserting the collar 16 results in the full height parts 22b of the ribs 22 bearing against the part 24a of the bore or opening 24 formed with the grooves 26. As shown in FIG. 3, the relative diameters of these parts results in the full height parts 22b of the ribs 22 cutting into and deforming the part 24a of the bore or opening 24 of the rotor 12 formed with the groove 26 such that relative angular movement between the collar 16 and the rotor 12 is not permitted. As the collar 16 is secured to the shaft 14 against relative rotation by virtue of the cooperation of the spline formations 18, 20, it will be appreciated that the positioning arrangement serves to correctly position, and resist relative angular movement between, the rotor 12 and shaft 14.

The formation of the grooves 26 in the rotor 12 serves to ensure that the deformation thereof which occurs upon the insertion of the collar 16 does not result in the formation or application of unacceptably high hoop stresses. However, it is recognised that with some designs of rotor 12 (for example rotors with a relatively large cross-sectional area) there may not be a need for the grooves 26 in the rotor 12 to reduce the developed hoop stresses.

Once the lock nut 38 has been tightened to securely clamp the clamp member 32 and collar 16 in position, the thin walled part 42 of the clamp member 32 is deformed into at least some of the recesses 40. As a consequence, rotation of the nut 38 relative to the clamp member 32 is not permitted. As the clamp member 32 is keyed to the collar 16 by virtue of the location of the projection 36 within the recess 34, and the collar 16 is splined to the shaft 14, it will be appreciated that the lock nut 38 is thus secured against rotation relative to the shaft 14 and so is prevented from working loose.

The arrangement described hereinbefore is thus advantageous not only in that it provides a relatively simple installation process and allows accurate positioning of the rotor 12 upon the shaft 14, but also axial alignment of the rotor 12 with the stator can be achieved to a good degree of accuracy, as the rotor 12 can be clamped against a shoulder (not shown) provided on the shaft 14 by the action of the clamping arrangement 30.

Once installed, the rotor 12 is securely fixed to the shaft 14 against movement relative thereto. Furthermore, it is accurately positioned relative thereto. As a result, the output of the sensor may be of good accuracy.

Furthermore, if there is a need to remove the rotor 12, this can be achieved by appropriate deformation of the thin walled part 42 of the clamp member 32 to allow rotation and removal of the lock nut 38. Once the lock nut 38 has been removed, the clamp member 32 and collar 16 can be extracted and the rotor 12 removed. Subsequent reassembly will, most likely, require replacement of the clamp member 32, but the other parts may be reused.

Whilst the description hereinbefore and the accompanying drawings relate to a specific embodiment of the invention, it will be appreciated that a wide range of modifications and alterations may be made thereto without departing from the scope of the invention as defined by the appended claims.

The invention claimed is:

1. A positioning arrangement for positioning a rotor relative to a shaft, the positioning arrangement comprising:
   a rotor;
   a shaft positioned in the rotor;
   a collar provided with a formation cooperable with a corresponding formation provided upon the shaft to resist relative angular movement between the collar and the shaft, the collar being provided with an external, generally axially extending rib cooperable with the rotor to deform the rotor to resist relative rotation between the collar and the rotor; and
   a clamp arrangement to secure the collar to the shaft, the clamp arrangement comprising:
      a clamp member keyed to the collar; and
      a lock nut threadingly engaged with the shaft and serving to clamp the clamp member to the collar to prevent or resist axial movement thereof.

2. The positioning arrangement according to claim 1, wherein the formation provided on the collar comprises a spline formation cooperable with a corresponding spline formation provided upon the shaft.

3. The positioning arrangement according to claim 1, wherein the generally axially extending rib is one of a plurality of ribs or serrations provided upon the collar.

4. The positioning arrangement according to claim 1, wherein the rotor includes a bore and the rib on the collar engages and deforms an inner diameter of the bore of the rotor.

5. The positioning arrangement according to claim 4, wherein the inner diameter of bore of the rotor is provided with one or more grooves to aid deformation by the rib.

6. The positioning arrangement according to claim 5, wherein the grooves are substantially annular grooves.

7. The positioning arrangement according to claim 5, wherein the rib has a reduced height part and a full height part.

8. The positioning arrangement according to claim 7, wherein the inner diameter of the bore of the rotor is approximately equal to or larger than the diameter of the reduced height part of the rib.

9. The positioning arrangement according to claim 7, wherein the inner diameter of the bore of the rotor is smaller than the full height part of the rib.

10. The positioning arrangement according to claim 7, wherein when the collar is in an assembled position, the full height part of the rib lies adjacent to the grooves in the inner diameter of the rotor.

11. The positioning arrangement according to claim 1, wherein the rib extends over only part of the axial length of the collar.

12. The positioning arrangement according to claim 1, wherein the collar has a pocket into which a projection on the clamp member extends to key the clamp member to the collar.

13. The positioning arrangement according to claim 1, wherein the lock nut is provided with at least one slot into which part of the clamp member is capable of being deformed, after tightening of the lock nut, to resist rotation of the clamp member relative to the lock nut.

* * * * *